Oct. 10, 1944.   L. GELBMAN   2,360,122
BRICK MACHINE
Filed Sept. 30, 1943   2 Sheets-Sheet 1

INVENTOR.
LOUIS GELBMAN
BY
ATTORNEY

Oct. 10, 1944.　　　　　L. GELBMAN　　　　　2,360,122
BRICK MACHINE
Filed Sept. 30, 1943　　　2 Sheets-Sheet 2
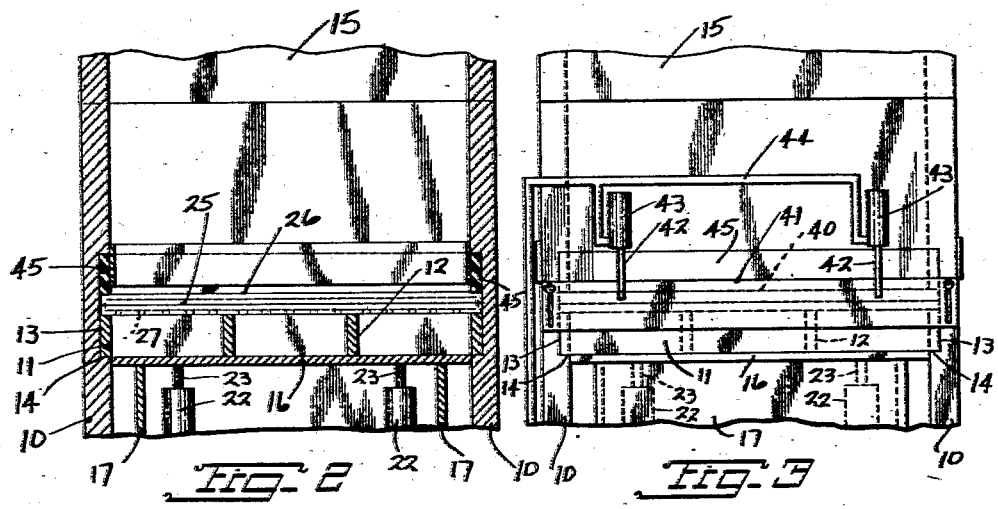
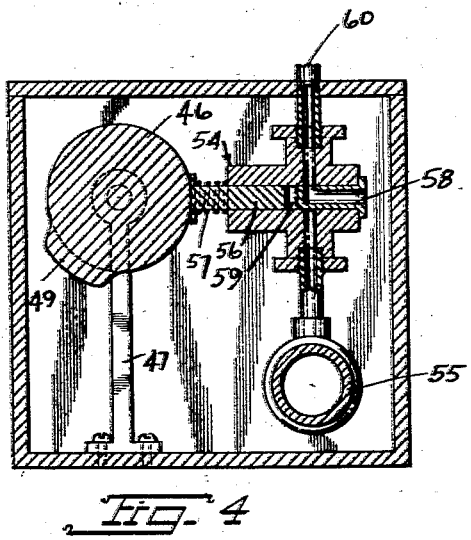
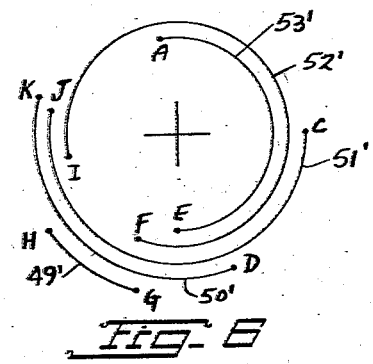
INVENTOR.
LOUIS GELBMAN
BY
ATTORNEY.

Patented Oct. 10, 1944

2,360,122

UNITED STATES PATENT OFFICE 2,360,122

BRICK MACHINE

Louis Gelbman, Yonkers, N. Y., assignor of one-half to Hamlin F. Andrus, Yonkers, N. Y.

Application September 30, 1943, Serial No. 504,362

10 Claims. (Cl. 25—41)

This invention relates to new and useful improvements in a brick or slab machine or the like.

The invention proposes to construct a brick or slab machine which is of particularly simple construction which may manufacture brick or the like at an especially rapid rate.

The dominating feature mentioned above is obtained in this new machine by a novel mechanism for ejecting the bricks from the mold in which they are molded. It is proposed that said mold be divided by a plurality of partitions to form a large number of compartments for forming a large number of bricks at one time. It is proposed to stationarily support said mold on a frame, but to so support the mold that it is free to vibrate. An overhead chute is provided for supplying the plastic material to the top of the mold. Furthermore, means is provided for engaging and holding a pallet against the bottom of said mold and lowering said pallet when the plastic material is ejected from the mold. It is proposed to provide a novel strike off slide for moving across the top of said mold. This novel slide is provided with a plurality of air discharge openings for blowing air against the top of the plastic material within the mold for assisting in ejecting same. This new ejecting system is relatively simple and highly efficient in operation.

The invention also contemplates forming the supply chute with a bleed opening in its side through which said strike off slide may shove excessive plastic material. The invention contemplates the provision of means for normally closing said bleed opening, and opening said bleed opening when said strike off slide moves forwards.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 2 is a fragmentary vertical sectional view taken on the line 2—2 of Fig. 1.

Fig. 3 is a fragmentary elevational view looking in the direction of the line 3—3 of Fig. 1.

Fig. 4 is a fragmentary enlarged vertical sectional view taken on the line 4—4 of Fig. 1.

Fig. 6 is a schematic diagram of the annular relationship of the control cams on the cylinder shown in Fig. 5.

Figure 1:
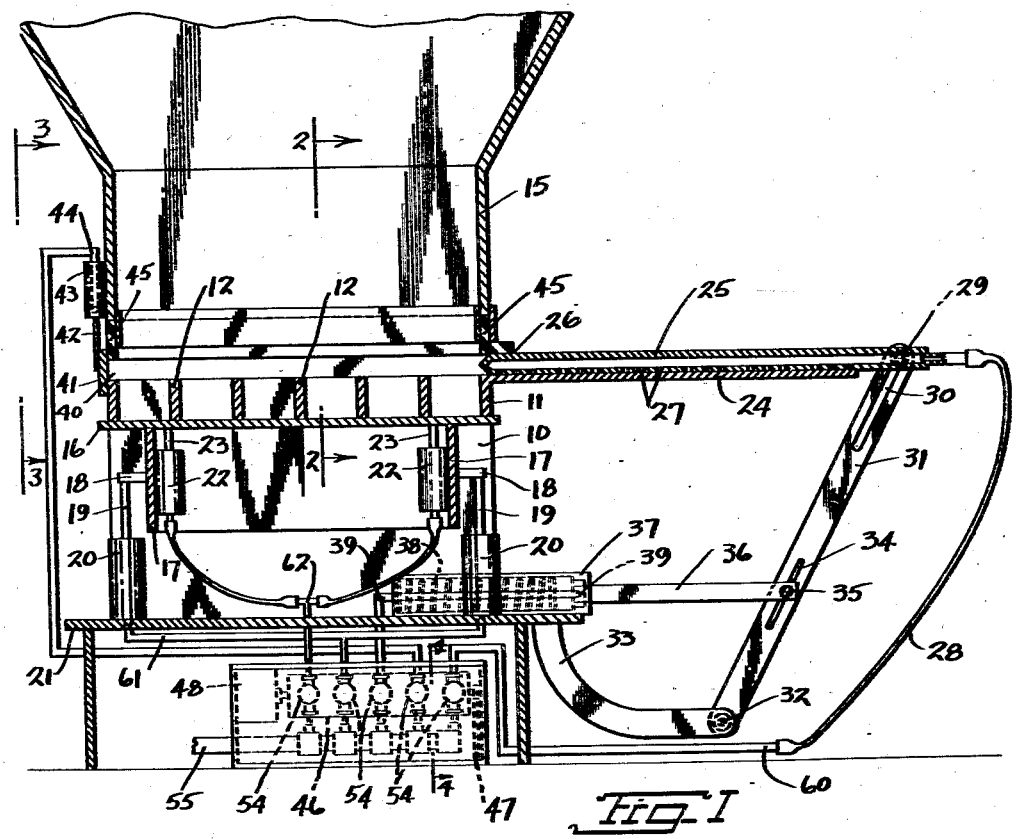
Fig. 1 is a vertical sectional view of a brick or slab machine constructed in accordance with this invention.
Figure 5:
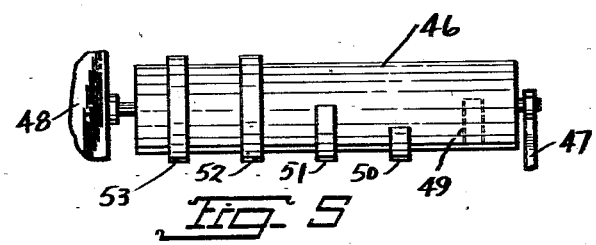
Fig. 5 is a front elevational view of the valve control cylinder shown in Fig. 1.

The improved brick or slab machine, in accordance with this invention, includes a frame 10. A mold 11 for molding brick is supported on said frame 10, and is free to vibrate vertically and is provided with an open top and bottom. The mold 11 is in the nature of a vertically disposed square or rectangular tubular member having a plurality of partitions 12 dividing off the compasses for forming the bricks or slabs. The mold 11 is supported at its sides by engaging into recesses 13 formed in the sides of the frame 10. Normally, the mold 11 rests upon the base shoulders 14 of said recesses 13. The mold is free to move slightly upwards so that it may vibrate vertically.

A supply chute 15 is provided for supplying plastic material into the top of said mold. There is means for engaging and holding a pallet 16 against the bottom of said mold 11 and lowering said pallet 16 when the plastic material is ejected from the mold. This means includes a support frame 17 engaging beneath the pallet 16. Lugs 18 project from the sides of the support frame 17. Piston rods 19 connect with the lugs 18 and connect with the pistons of pneumatic cylinders 20. These cylinders 20 are mounted on a table portion 21 of the frame 10. When air is supplied to said cylinders 20, the support frame 17 moves upwards and forces the pallet 16 against the bottom of the mold 11. When the air is allowed to run out of the cylinders 20, the support frame 17 will move downwards due to gravity, to its original position and so the pallet 16 is lowered.

Pneumatic vibrators 22 are mounted upon the support frame 17. These vibrators have operator stems 23 engaging the bottom of the pallet 16. The pallet 16 may be manually placed upon the support frame 17, though a preferred construction would be one in which an automatic conveyor is provided for supplying said pallets to the brick machine and for carrying away the pallets with the molded bricks thereon.

The mold 11 is also provided with a laterally extending support plate 24. A strike off slide 25 is slidably mounted upon the support plate 24 and has its front end engaging into an opening 26 formed in the side of the supply chute 15. This strike off slide 25 is for the purpose of moving across the top of the mold 11 to strike off the plastic material from the supply chute 15 so that the plastic material in the mold may be ejected.

The strike off slide 25 is of hollow airtight construction and is provided with a plurality of air discharge openings 27 through its bottom wall. These air discharge openings 27 will be located over the plastic material within the mold 11 so as to blow against the top faces thereof and assist in ejecting same from the mold. An air supply pipe 28 is connected with the hollow of the slide 25 for supplying the required air. The slide 25 has a pin 29 projecting from each side, said pins 29 engaging slots 30 in arms 31. Each arm 31 is pivotally supported at its bottom end by a pintle 32 upon a bracket 33 from the table portion 21. Each arm 31 is provided with an additional slot 34 engaged by a pin 35. These pins 35 are mounted upon the piston rods 36 of air cylinders 37. Springs 38 within the cylinders 37 normally urge the rods 36 into extended positions. The cylinders 37 are provided with air pipes 39 through which air may be supplied for forcing the piston rods 36 into the cylinders which indirectly move the strike off slide 25 forwards.

The supply chute 15 has a bleed opening 40 in its side through which said strike off slide 25 may shove excess plastic material as it moves forwards over the mold 11. The bleed opening 40 is normally closed with a bar 41. This bar 41 is supported by piston rods 42 which connect with cylinders 43 supplied by air pipes 44 by which the bar 41 may be raised for opening the bleed opening 40. Resilient material, such as rubber strips 45, is mounted on the supply chute 15 at points above the strike off slide 25. This resilient material is for the purpose of permitting the mold 11 to vibrate vertically. The resilient strips 45 furthermore reduce the leakage of plastic material from the supply chute 15.

The air supply to the various cylinders referred to, is controlled by a cam control cylinder 46. This cylinder is rotatively supported at one end in a standard 47. Its other end is supported and connected with a speed reduction unit electric motor 48. The cylinder 46 is provided with cams 49, 50, 51, 52 and 53. Adjacent each cam there is a control valve 54. Each control valve 54 connects with a main air supply line 55. Each control valve 54 is provided with a valve stem 56 normally urged outwards by the spring 57 so as to engage against said cylinder 46. Each valve stem 56 has a blow-off passage 58 which connects with the atmosphere. Each valve stem 56 also has a transverse passage 59 for connecting the main air supply pipe 55 with pipes for controlling the various cylinders at points at which air is needed.

The cam 49 of the cylinder 46 controls one of the valves 54 which controls a pipe line 60 which connects with the pipe 28 for supplying air to the strike off slide 25. The cam 50 controls one of the valves 54 which controls air to the pipe 44. The cam 51 controls another one of the valves 54 which controls air to the pipe 39. The cam 52 controls the valve 54 which supplies air to the pipe 61 to supply the air to the cylinders 20. The cam 53 controls the valve 54 supplying air to the pipe 62 which supplies air to the air vibrators 22. The angular relationship of the cams 49 to 53 inclusive is schematically illustrated in Fig. 6 in which arcuate lines are used to represent the arcuate lengths of said cams and their angular relationship with each other. Each arcuate line has been given a reference numeral distinguishing from the numeral given to the represented cam in that it is primed.

The operation of the machine is as follows:

The plastic material to make the bricks is fed into the supply chute 15. It enters the compartments of the mold 11 and comes to rest on the pallet 16. The parts at this moment are in the positions illustrated in Fig. 1. At this position of the parts, the air cylinders 20 are receiving air. For this reason the pallet 16 is raised. Now referring to Fig. 6, the point A indicates the moment at which the air is supplied to the vibrators 22. The vibrations serve to pack the plastic material into the mold 11. Following the diagram of Fig. 6 clockwise, the point C is soon reached. At this point air is still being supplied to the cylinders 20 and to the vibrators 22. At said point C air will now be supplied to the cylinders 37 which starts the strike off slide 25 moving forwards. At the point D air will be supplied to the cylinders 43 which lifts the bar 41 to open the bleed opening 40. The strike off slide 25 prior to the point D moves forwards striking off the plastic material from the top of the mold 11 until it is near the end of its forward stroke and then past the point D it forces excess plastic material through the bleed opening 40. This excess material may be caught by a chute, not illustrated on the drawing, and later on fed back to the supply chute 15.

At the point E air is cut off from the vibrator 22. At the point F air is cut off from the cylinders 20 and the support frame 17 starts moving down. At the point G which is in line with the point F air is supplied to the strike off slide 25 and passes out from the air openings 27 assisting gravity in forcing the formed plastic material bricks from the mold 11 down with the pallet 16. At the point H the air supply to the strike off slide 25 is cut off. At the point I, air is supplied to the cylinders 20 to re-engage a new pallet across the bottom of the mold 11. At the point J the air is cut off from the cylinders 37 indirectly causing the strike off slide 25 to start moving rearwards and back to its original position, shown in Fig. 1. At the point K an intant after the slide 25 starts moving rearwards, the air is cut off from the cylinders 43, indirectly causing the bar 41 to move downwards to close the bleed opening 40.

An important feature of the new brick machine resides in the specific means for supplying air to the mold 11 to assist in ejecting the bricks. Another feature resides in the operation of the bleed opening 40.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a brick and the like machine, a frame, a mold for molding brick supported on said frame and being free to vibrate and having an open top and bottom, a supply chute for supplying plastic material to the top of said mold, means for engaging and holding a pallet against the bottom of said mold and lowering said pallet when the plastic material is ejected from said mold, a strike-off slide for moving across the top of said mold and having air discharge openings for blowing against the top of the plastic material in said mold for assisting in ejecting same, and means for blowing air through said air discharge openings for ejecting said plastic material.

2. In a brick and the like machine, a frame, a mold for molding brick supported on said frame and being free to vibrate and having an open top and bottom, a supply chute for supplying plastic material to the top of said mold, means for engaging and holding a pallet against the bottom of said mold and lowering said pallet when the plastic material is ejected from said mold, a strike-off slide for moving across the top of said mold and having air discharge openings for blowing against the top of the plastic material in said mold for assisting in ejecting same, and means for blowing air through said air discharge openings for ejecting said plastic material, said strike-off slide being hollow and airtight for receiving a supply of air, and said discharge openings being formed in the bottom wall of said strike-off slide.

3. In a brick and the like machine, a frame, a mold for molding brick supported on said frame and being free to vibrate and having an open top and bottom, a supply chute for supplying plastic material to the top of said mold, means for engaging and holding a pallet against the bottom of said mold and lowering said pallet when the plastic material is ejected from said mold, a strike-off slide for moving across the top of said mold and having air discharge openings for blowing against the top of the plastic material in said mold for assisting in ejecting same, and means for blowing air through said air discharge openings for ejecting said plastic material, including a cam-controlled valve controlling the discharge of air through said discharge openings during the ejection period of the molded brick from said mold.

4. In a brick and the like machine, a frame, a mold for molding brick supported on said frame and being free to vibrate and having an open top and bottom, a supply chute for supplying plastic material to the top of said mold, means for engaging and holding a pallet against the bottom of said mold and lowering said pallet when the plastic material is ejected from said mold, a strike-off slide for moving across the top of said mold and having air discharge openings for blowing against the top of the plastic material in said mold for assisting in ejecting same, means for blowing air through said air discharge openings for ejecting said plastic material, said supply chute having a bleed opening in its side through which said strike-off slide may shove excess plastic material, means for normally closing said bleed opening and opening said bleed opening when said strike-off slide moves forward.

5. In a brick and the like machine, a frame, a mold for molding brick supported on said frame and being free to vibrate and having an open top and bottom, a supply chute for supplying plastic material to the top of said mold, means for engaging and holding a pallet against the bottom of said mold and lowering said pallet when the plastic material is ejected from said mold, a strike-off slide for moving across the top of said mold and having air discharge openings for blowing against the top of the plastic material in said mold for assisting in ejecting same, means for blowing air through said air discharge openings for ejecting said plastic material, said supply chute having a bleed opening in its side through which said strike-off slide may shove excess plastic material, means for normally closing said bleed opening and opening said bleed opening when said strike-off slide moves forward including a bar normally closing said bleed opening, and means for moving said bar from said positions.

6. In a brick and the like machine, a frame, a mold for molding brick supported on said frame and being free to vibrate and having an open top and bottom, a supply chute for supplying plastic material to the top of said mold, means for engaging and holding a pallet against the bottom of said mold and lowering said pallet when the plastic material is ejected from said mold, a strike-off slide for moving across the top of said mold and having air discharge openings for blowing against the top of the plastic material in said mold for assisting in ejecting same, means for blowing air through said air discharge openings for ejecting said plastic material, said supply chute having a bleed opening in its side through which said strike-off slide may shove excess plastic material, means for normally closing said bleed opening and opening said bleed opening when said strike-off slide moves forward including a bar normally closing said bleed opening, and means for moving said bar from said positions, comprising pneumatic cylinders connected with the bar, and a cam-controlled valve for controlling said cylinders.

7. In a brick and the like machine, a mold for plastic material and having an open top and bottom, a strike off slide for moving across the top of the mold of said machine and having air discharge openings for blowing against the top of said plastic material in said mold for assisting in ejecting same downwards through the bottom of said molds, and means for blowing air through said discharge openings for ejecting said plastic material.

8. A brick and the like machine, comprising a frame, a mold for molding brick supported on said frame and being free to vibrate and having an open top and bottom, a supply chute for supplying plastic material to the top of said mold, means for engaging and holding a pallet against the bottom of said mold and lowering said pallet when the plastic material is ejected from said mold, a strike-off slide for moving across the top of said mold and having air discharge openings for blowing against the top of the plastic material in said mold for assisting in ejecting same, means for blowing air through said air discharge openings for ejecting said plastic material, air cylinders for moving said strike-off slide and for operating said pallet means, a pneumatic vibrator for supplying vibrations to said mold, and cam-controlled valves for controlling said pneumatic vibrator and said cylinders.

9. A brick and the like machine, comprising a frame, a mold for molding brick supported on said frame and being free to vibrate and having an open top and bottom, a supply chute for supplying plastic material to the top of said mold, means for engaging and holding a pallet against the bottom of said mold and lowering said pallet when the plastic material is ejected from said mold, a strike-off slide for moving across the top of said mold and having air discharge openings for blowing against the top of the plastic material in said mold for assisting in ejecting same, means for blowing air through said air discharge openings for ejecting said plastic material, air cylinders for moving said strke-off slide and for operating said pallet means, a pneumatic vibrator for supplying vibrations to said mold, cam-controlled valves for controlling said pneumatic vibrator and said cylinders, said supply chute having a bleed opening in its side through which said strike-off slide may shove excess plastic material, and means for normally closing said bleed opening and opening said bleed opening when said strike-off slide moves forwards.

10. A brick and the like machine, comprising a frame, a mold for molding brick supported on said frame and being free to vibrate and having an open top and bottom, a supply chute for supplying plastic material to the top of said mold, means for engaging and holding a pallet against the bottom of said mold and lowering said pallet when the plastic material is ejected from said mold, a strike-off slide for moving across the top of said mold and having air discharge openings for blowing against the top of the plastic material in said mold for assisting in ejecting same, means for blowing air through said air discharge openings for ejecting said plastic material, air cylinders for moving said strike-off slide and for operating said pallet means, a pneumatic vibrator for supplying vibrations to said mold, cam-controlled valves for controlling said pneumatic vibrator and said cylinders, said supply chute having a bleed opening in its side through which said strike-off slide may shove excess plastic material, and means for normally closing said bleed opening and opening said bleed opening when said strike-off slide moves forwards, said means for controlling said bleed opening including cylinders, and said last named cylinders being controlled with a cam control valve.

LOUIS GELBMAN.